United States Patent
Tenselius et al.

(10) Patent No.: US 12,536,904 B2
(45) Date of Patent: Jan. 27, 2026

(54) METHOD AND CONTROL ARRANGEMENT FOR AUTONOMY ENABLING INFRA-STRUCTURE FEATURES

(71) Applicant: Scania CV AB, Södertälje (SE)

(72) Inventors: Daniel Tenselius, Trosa (SE); Mattias Johansson, Stockholm (SE); Fredrich Claezon, Värmdö (SE); Erik Johansson, Trosa (SE); Mikael Lindberg, Huddinge (SE); Navid Mahabadi, Älvsjö (SE); Patricio Valenzuela, Huddinge (SE)

(73) Assignee: Scania CV AB, Södertälje (SE)

( * ) Notice: Subject to any disclaimer, the term of this patent is extended or adjusted under 35 U.S.C. 154(b) by 557 days.

(21) Appl. No.: 17/636,938

(22) PCT Filed: Aug. 25, 2020

(86) PCT No.: PCT/SE2020/050815
§ 371 (c)(1),
(2) Date: Feb. 21, 2022

(87) PCT Pub. No.: WO2021/040604
PCT Pub. Date: Mar. 4, 2021

(65) Prior Publication Data
US 2022/0358837 A1   Nov. 10, 2022

(30) Foreign Application Priority Data

Aug. 30, 2019   (SE) .................................. 1950992-6

(51) Int. Cl.
*G08G 1/0962* (2006.01)
*G06T 7/73* (2017.01)
(Continued)

(52) U.S. Cl.
CPC .......... *G08G 1/09623* (2013.01); *G06T 7/73* (2017.01); *G06T 7/80* (2017.01); *G06V 20/58* (2022.01);
(Continued)

(58) Field of Classification Search
CPC ......... G08G 1/09623; G06T 7/80; G06T 7/73; G06V 20/58; G01S 7/40; G01S 7/497;
(Continued)

(56) References Cited

U.S. PATENT DOCUMENTS 5,250,955 A    10/1993  Major et al.
9,719,801 B1    8/2017  Ferguson et al.
(Continued)

FOREIGN PATENT DOCUMENTS

DE    102016013470 A1    5/2017
EP         1376051 A1    1/2004
(Continued)

OTHER PUBLICATIONS

Scania CV AB, European Patent Application No. 20858924.2, Extended European Search Report, Aug. 7, 2023.
(Continued)

*Primary Examiner* — Peter D Nolan
*Assistant Examiner* — Wae L Louie
(74) *Attorney, Agent, or Firm* — Moore & Van Allen PLLC; W. Kevin Ransom (57) ABSTRACT

A method, a control arrangement and a sensor target for enabling calibration of vehicle sensors. The sensor target comprises a plurality of recognition zones, each comprising a recognition pattern dedicated to a distinct sensor modality, for enabling calibration of vehicle sensors of the respective sensor modality; and localization dependent information
(Continued)

associated with at least one recognition zone, provided to the vehicle via a vehicle sensor reading.

13 Claims, 9 Drawing Sheets

(51) Int. Cl.
| | |
|---|---|
| *G06T 7/80* | (2017.01) |
| *G06V 20/58* | (2022.01) |
| *B60W 50/00* | (2006.01) |
| *B60W 50/02* | (2012.01) |
| *G01S 7/40* | (2006.01) |
| *G01S 7/497* | (2006.01) |
| *G01S 7/52* | (2006.01) |

(52) U.S. Cl.
CPC . *B60W 2050/0083* (2013.01); *B60W 50/0205* (2013.01); *B60W 2050/0215* (2013.01); *G01S 7/40* (2013.01); *G01S 7/497* (2013.01); *G01S 7/52004* (2013.01); *G06T 2207/30252* (2013.01)

(58) Field of Classification Search
CPC ..... B60W 50/0205; B60W 2050/0083; B60W 2050/0215
See application file for complete search history.

(56) References Cited

U.S. PATENT DOCUMENTS

| | | | | |
|---|---|---|---|---|
| 11,474,247 | B2* | 10/2022 | Zhu | G06T 17/05 |
| 11,973,671 | B1* | 4/2024 | Lee | H04L 43/026 |
| 2006/0164295 | A1* | 7/2006 | Focke | G01S 13/867 |
| | | | | 342/174 |
| 2009/0228204 | A1 | 9/2009 | Zavoli et al. | |
| 2010/0076710 | A1* | 3/2010 | Hukkeri | G01S 7/4004 |
| | | | | 702/97 |
| 2015/0279182 | A1* | 10/2015 | Kanaujia | G08B 13/19608 |
| | | | | 382/103 |
| 2016/0161602 | A1 | 6/2016 | Prokhorov | |
| 2016/0245899 | A1 | 8/2016 | Rybski | |
| 2016/0246302 | A1* | 8/2016 | Liao | G01C 21/20 |
| 2016/0265919 | A1* | 9/2016 | Schuller | G01C 21/3602 |
| 2018/0045519 | A1* | 2/2018 | Ghadiok | G06T 7/74 |
| 2018/0284243 | A1* | 10/2018 | Wood | G05D 1/0234 |
| 2019/0162820 | A1* | 5/2019 | Agarwal | G01S 7/497 |
| 2019/0204425 | A1* | 7/2019 | Abari | G01S 7/497 |
| 2020/0226790 | A1* | 7/2020 | Alvarez | G01S 13/865 |
| 2020/0406904 | A1* | 12/2020 | Yan | G07C 5/0841 |
| 2021/0096215 | A1* | 4/2021 | Slobodyanyuk | H04W 4/38 |
| 2021/0134080 | A1* | 5/2021 | Miura | G07C 5/0808 |
| 2021/0192788 | A1* | 6/2021 | Diederichs | G01S 17/931 |
| 2022/0198714 | A1* | 6/2022 | del Pero | G06T 7/85 |
| 2022/0358837 | A1* | 11/2022 | Tenselius | G06V 20/58 |
| 2023/0166758 | A1* | 6/2023 | Brandon | B60W 60/00 |
| | | | | 701/23 |
| 2024/0104879 | A1* | 3/2024 | Jiang | B60W 40/02 |
| 2024/0104941 | A1* | 3/2024 | Ren | G06V 20/59 |
| 2024/0183963 | A1* | 6/2024 | Swierczynski | G06T 7/593 |

FOREIGN PATENT DOCUMENTS

| | | |
|---|---|---|
| EP | 2767846 A1 | 8/2014 |
| EP | 3333048 A1 | 6/2018 |
| EP | 3492948 A1 | 6/2019 |
| JP | H11296227 A | 10/1999 |

OTHER PUBLICATIONS

Scania CV AB, International Patent Application No. PCT/SE2020/050815, International Preliminary Report on Patentability, Mar. 1, 2022.

Scania CV AB, International Patent Application No. PCT/SE2020/050815, International Search Report, Sep. 7, 2020.

Scania CV AB, International Patent Application No. PCT/SE2020/050815, Written Opinion, Sep. 7, 2020.

Scania CV AB, Swedish Patent Application No. 1950992-6, Office Action, Feb. 14, 2020.

* cited by examiner

METHOD AND CONTROL ARRANGEMENT FOR AUTONOMY ENABLING INFRA-STRUCTURE FEATURES

CROSS-REFERENCE TO RELATED APPLICATIONS

This application is a National Stage Patent Application (filed under 35 § U.S.C. 371) of PCT/SE2020/050815, filed Aug. 25, 2020 of the same title, which, in turn claims priority to Swedish Patent Application No. 1950992-6 filed Aug. 30, 2019 of the same title; the contents of each of which are hereby incorporated by reference.

FIELD OF THE INVENTION

This document discloses a sensor target, a control arrangement and a method therein. More particularly, sensor target, method and control arrangement are described, for enabling calibration of vehicle sensors onboard the vehicle.

BACKGROUND OF THE INVENTION

It is a goal to achieve fully self-operating vehicles in a defined environment. However due to lack of maturity in the fields of sensor hardware, perception functionality, localization and similar, full autonomy with sufficient safety and uptime has yet not been achieved.

Localization of a vehicle may be made by using landmarks. The conventional way in landmark based localization is to process sensor data to detect different types of landmarks and fuse GPS data together with other types of sensor data to solve the localization problem. The currently available landmarks however only provide limited information. There seems to be no system available that extends landmarks information for further use cases.

One of the key requirements of any autonomous vehicle is the ability to localise itself in any environment given the map. The state-of-the-art technologies fuse sensor information based on Global Positioning System (GPS), camera, Inertial Measurement Unit (IMU), etc., together with landmarks to address this task. The later requires that the nearby landmarks are detected and associated with the map to find the position of the vehicle in the map. This might be challenging due to lack of available landmarks, limited sensor range and occluded landmarks by other objects or darkness/weather conditions, for instance. In addition, in GPS denied environments such as indoor applications, tunnels, mines or other places where the GPS coverage is poor or non-existent for example in cities with tall building or under bridges, the problem will be even more severe. Even when there is a good GPS coverage, there is usually poor data accuracy which is not suitable for autonomous driving.

Another problem with sensors of an autonomous vehicle is that there may not be any human onboard, detecting a sensor error and/or performing sensor calibration of the vehicle sensors. This may result in an accident, or possibly trigger an emergency stop and call for a service mechanic to come and check/calibrate the sensors.

Documents US 20160246302 and US 20160265919 present solutions for extracting data from existing infrastructure, buildings and/or road signs, based on optical readings. Information encoded in 2D bar codes, Quick Response (QR) codes etc. This graphically encoded information may be utilized for positioning of the vehicle.

A problem with the disclosed solutions is that it may not be possible to perceive the information by a sensor on the vehicle or detect the codes in case these are occluded by another vehicle, by obscure weather conditions or other similar reasons. The documents do not discuss diagnostics and/or calibration of the vehicle sensors.

It would be desired to find a solution addressing at least some of the above issues.

SUMMARY OF THE INVENTION

It is therefore an object of this invention to solve at least some of the above problems and improve autonomous functions of a vehicle.

According to a first aspect of the invention, this objective is achieved by a sensor target for enabling calibration of vehicle sensors. The sensor target comprises a plurality of recognition zones, each comprising a recognition pattern dedicated to a distinct sensor modality, for enabling calibration of vehicle sensors of the respective sensor modality.

According to a second aspect of the invention, this objective is achieved by a method in a control arrangement of a vehicle. The method aims at obtaining information from a sensor target and calibrating an onboard sensor. The method comprises detecting a plurality of recognition zones on the sensor target, each comprising a recognition pattern dedicated to a distinct sensor modality with a respective onboard sensor. Further, the method also comprises calibrating the onboard sensors based on sensor detection of the respective recognition zone. The method also comprises obtaining localization dependent information associated with at least one detected recognition zone, via vehicle sensor reading.

According to a third aspect of the invention, this objective is achieved by a control arrangement of a vehicle, for obtaining information from a sensor target and calibrating an onboard sensor. The control arrangement is configured to detect a plurality of recognition zones on the sensor target, each comprising a recognition pattern dedicated to a distinct sensor modality with a respective onboard sensor. Further, the control arrangement is configured to calibrate the onboard sensor based on sensor detection of the respective recognition zone. Also, the control arrangement is additionally configured to obtain localization dependent information associated with at least one detected recognition zone, via vehicle sensor reading.

By adding designed features to the infrastructure, i.e. on road-side structures, it is possible to increase the performance of on-board sensors and even use them for new tasks, for example improved localization; and/or for obtaining information concerning local traffic conditions, for example alerting the vehicle for a queue establishment or presence of a location of enhanced traffic incidents, etc.

Extra knowledge about the environment or any type of extended information necessary for autonomous driving may thereby be provided to the vehicle, such as global position information, local map of the environment, extra information about specific dangerous places, etc. The information may be utilized e.g. for localization, mapping, path planning, obstacle avoidance, etc.

Another benefit is the potential for continuous sensor performance testing and/or calibration of onboard sensors.

The solution is intended to address some of the above issues by turning the landmarks to report their position which contains e.g. the GPS coordinates upon vehicle request. This can be seen as a supplementary add-on to GPS depending on the environment. The solution is not limited to localization application and any other type of useful information may also be integrated to the landmarks depending on the requirements and application. Thus, traffic safety is enhanced.

Some advantages achieved by the disclosed solution is that autonomous functions of a vehicle are enabled, also when the vehicle does not comprise perfect sensors and/or localization information. Also, the described solution may be applied in most sites and/or scenarios. Furthermore, the disclosed solutions according to some embodiments only comprises passive features, which makes the implementation relatively cheap.

Other advantages and additional novel features will become apparent from the subsequent detailed description.

BRIEF DESCRIPTION OF THE DRAWINGS

Embodiments of the invention will now be described in further detail with reference to the accompanying figures, in which.

DETAILED DESCRIPTION OF THE INVENTION

Embodiments of the invention described herein are defined as a sensor target, control arrangement and method in a control arrangement, which may be put into practice in the embodiments described below. These embodiments may, however, be exemplified and realized in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1A:
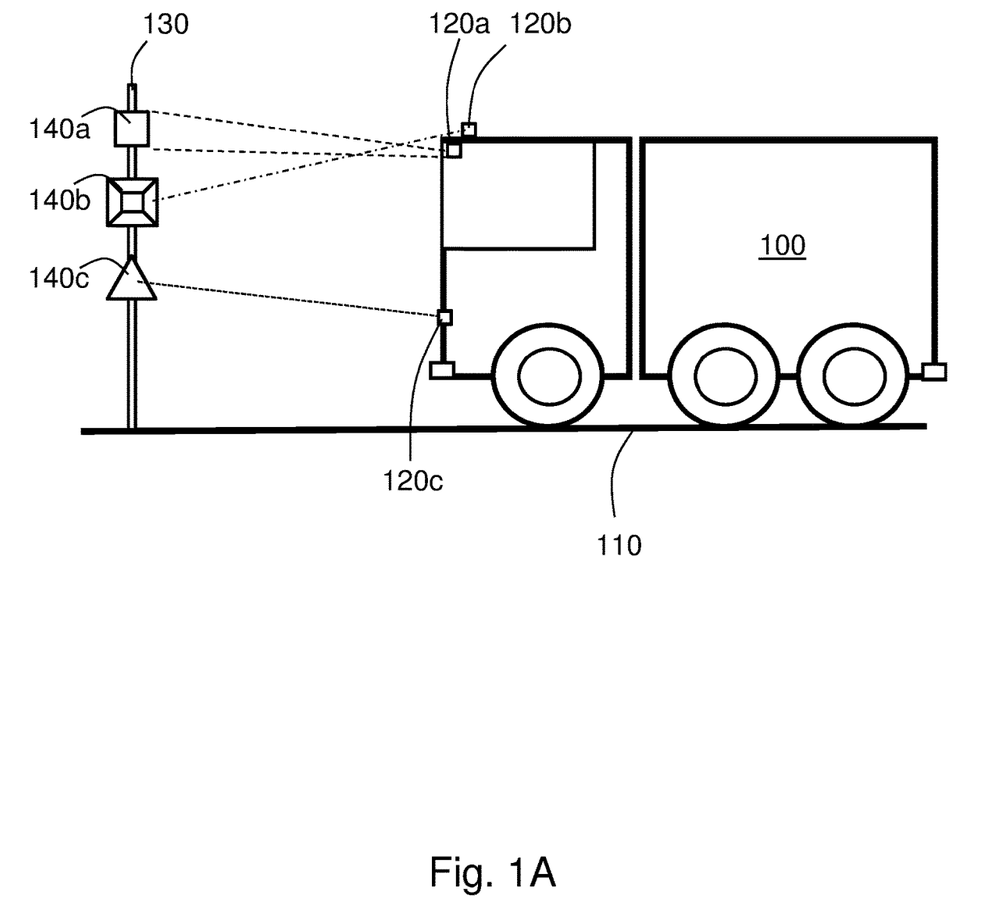
FIG. 1A illustrates an embodiment of a vehicle and a sensor target.

FIG. 1A illustrates a scenario wherein a vehicle 100 is driving on a road 110.

The vehicle 100 may be driver controlled or driverless autonomously controlled in different embodiments. The vehicle 100 may comprise a means for transportation in broad sense such as e.g. a truck, a car, a motorcycle, a trailer, a bus, a bike, a train, a tram, an aircraft, a watercraft, an unmanned underwater vehicle, a drone, a humanoid service robot, a spacecraft, or other similar manned or unmanned means of conveyance running e.g. on wheels, rails, air, water or similar media.

The vehicle 100 comprises a plurality of sensors 120a, 120b, 120c. The sensors 120a, 120b, 120c may be of the same or different types and comprise e.g. a camera, a stereo camera, an infrared camera, a video camera, a radar, a lidar, an ultrasound device, a time-of-flight camera, or similar device, in different embodiments.

In some embodiments, the sensor 120a, 120b, 120c may comprise e.g. a motion detector and/or be based on a Passive Infrared (PIR) sensor sensitive to a person's skin temperature through emitted black body radiation at mid-infrared wavelengths, in contrast to background objects at room temperature; or by emitting a continuous wave of microwave radiation and detect motion through the principle of Doppler radar; or by emitting an ultrasonic wave and detecting and analysing the reflections; or by a tomographic motion detection system based on detection of radio wave disturbances, to mention some possible implementations.

A road-side sensor target 130 may comprise a plurality of recognition zones 140a, 140b, 140c. Each of the recognition zones 140a, 140b, 140c may be dedicated to a respective sensor modality such as e.g. camera, lidar, radar, ultrasonic, infrared light, stereo vision, time-of-flight, video.

The road-side sensor target 130 may comprise a structure such as e.g. a building, a control tower, a lamp post, a traffic sign, a pole, a fence, etc.

In some embodiments, the first of the recognition zones 140a may comprise an optical recognition pattern dedicated to a visual sensor such as a camera. The visual recognition zone 140a may comprise localization information in form of a visual code such as a barcode, a QR code, letters, etc. Further, the visual recognition zone 140a may comprise a camera diagnostic patterns, for enabling continuous optical performance checks.

Further, the second of the recognition zones 140b may comprise a texture recognition pattern dedicated to a lidar. The texture recognition zone 140b may comprise localization information in form of e.g. a texture-based bar code. Further, the texture recognition zone 140b may comprise a lidar diagnostic pattern.

Also, the third of the recognition zones 140c may comprise radar reflector features such as a physical structure for radar localization. Also, the radar recognition zone 140c may comprise a radar recognition pattern.

The visual sensor 120a, 120b, 120c may comprise or be connected to a control arrangement configured for image recognition/computer vision and object recognition. Computer vision is a technical field comprising methods for acquiring, processing, analysing, and understanding images and, in general, high-dimensional data from the real world in order to produce numerical or symbolic information. A theme in the development of this field has been to duplicate the abilities of human vision by electronically perceiving and understanding an image. Understanding in this context means the transformation of visual images (the input of retina) into descriptions of world that can interface with other thought processes and elicit appropriate action. This image understanding can be seen as the disentangling of symbolic information from image data using models constructed with the aid of geometry, physics, statistics, and learning theory. Computer vision may also be described as the enterprise of automating and integrating a wide range of processes and representations for vision perception.

The sensor data of the visual sensor/-s 120a, 120b, 120c may take many forms, such as e.g. images, video sequences, views from multiple cameras, or multi-dimensional data from a scanner, data of a lidar, radar, etc; or a combination thereof.

Further, the respective recognition zones 140a, 140b, 140c may comprise the same, i.e. redundant information; or different information. The recognition zones 140a, 140b, 140c may comprise various supplemental information for example related to local traffic rules, geographical coordinates, neighbouring landmarks (local distributed map), extra information about special areas, statistics such as expected number of pedestrians, etc.

An advantage with the described embodiment is that autonomous functions are enabled early, without requirement for perfect sensors and/or localization. Another advantage is that the recognition zones 140a, 140b, 140c may be applied an existing infrastructure and fit in the already existing traffic environment. Yet an advantage of the illustrated solution is that only passive features are required, making it cheap to implement and maintain.

Figure 1B:
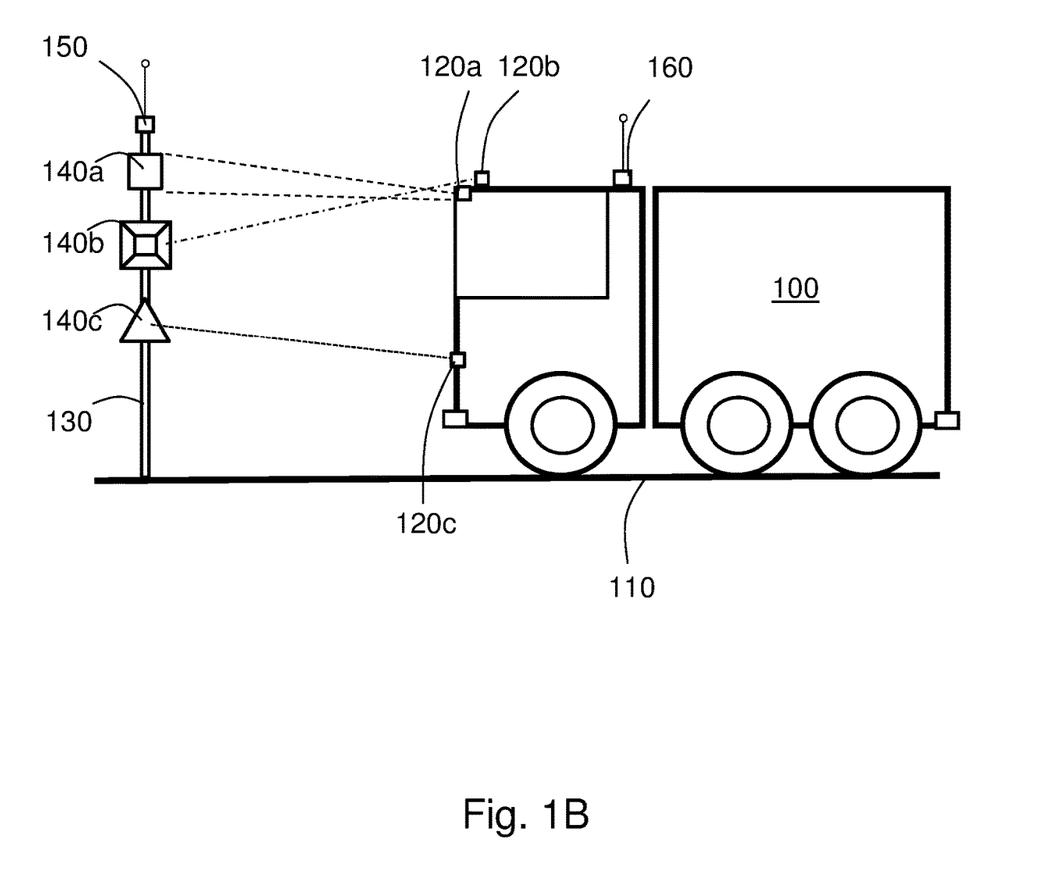
FIG. 1B illustrates an embodiment of a vehicle and a sensor target.

FIG. 1B illustrates a scenario comprising a vehicle 100 is driving on a road 110, similar to the scenario of FIG. 1A and comprising the same or similar sensors 120a, 120b, 120c and/or sensor recognition zones 140a, 140b, 140c situated on the road-side sensor target 130.

However, in the illustrated scenario of FIG. 1B, the road-side sensor target 130 comprises a wireless communication device 150 for providing localization dependent information to a wireless receiver 160 of the vehicle 100.

The wireless communication device 150 may communicate wirelessly with the wireless receiver 160. Such wireless signal may comprise, or at least be inspired by wireless communication technology such as Wi-Fi, Wireless Local Area Network (WLAN), Ultra Mobile Broadband (UMB), Bluetooth (BT), Near Field Communication (NFC), Radio-Frequency Identification (RFID), optical communication such as Infrared Data Association (IrDA) or infrared transmission to name but a few possible examples of wireless communications in some embodiments.

In some embodiments, the communication between the wireless communication device 150 and the wireless receiver 160 may be performed via vehicle-to-vehicle (V2V) communication, e.g. based on Dedicated Short-Range Communications (DSRC) devices. DSRC works in 5.9 GHz band with bandwidth of 75 MHz and approximate range of 1000 m in some embodiments.

The wireless communication may be made according to any IEEE standard for wireless vehicular communication like e.g. a special mode of operation of IEEE 802.11 for vehicular networks called Wireless Access in Vehicular Environments (WAVE). IEEE 802.11p is an extension to 802.11 Wireless LAN medium access layer (MAC) and physical layer (PHY) specification.

The communication may alternatively be made over a wireless interface comprising, or at least being inspired by radio access technologies such as e.g. third Generation Partnership Project (3GPP) 5G/4G, 3GPP Long Term Evolution (LTE), LTE-Advanced, Groupe Spécial Mobile (GSM), or similar, just to mention some few options, via a wireless communication network.

By providing information from the road-side sensor target 130 to the vehicle 100 not only by sensor information encoded on the respective sensor recognition zones 140a, 140b, 140c, but by wireless communication, additional and continuously updated information may be provided to the vehicle 100.

The disclosed embodiment involving wireless communication between the road-side sensor target 130 and the vehicle 100 brings several advantages, such as for example enhanced localization solution in general and improvement of localization precision specially in GPS denied environments in e.g. mines, tunnels, subterranean parkings, urban canyons, etc.

Further, the disclosed embodiment makes the localization task easier since there is not necessarily required to distinguish between landmarks when the road-side sensor target 130 and the wireless communication device 150 are in active mode, i.e. transmitting wireless information. Then no landmark detection is needed. Thus, information may be transferred also e.g. when the sensors of the vehicle 100 are dysfunctional; or when the sensor recognition zones 140a, 140b, 140c are blocked, for example.

Via the wireless communication, a local map of the environment may be transferred to the vehicle 100 and may be used for localization, e.g. while navigating in a mine or other subterranean structure; warehouse, parking or similar.

Augmented information provided via wireless communication makes the perception and planning tasks easier by providing extra information regarding the environment.

The illustrated solution may be utilized both in outdoor as well as indoor applications and brings a flexibility in terms of installation of landmarks 130. Sometimes it may be desired to provide more information to the vehicle 100 than is possible to provide on sensor codes on the sensor recognition zones 140a, 140b, 140c, which may be provided via the wireless communication device 150 in active mode. In other landmarks 130, the information provided on the sensor recognition zones 140a, 140b, 140c may be sufficient and the wireless communication device 150 may be set to passive mode, or even be completely omitted.

Figure 2A:
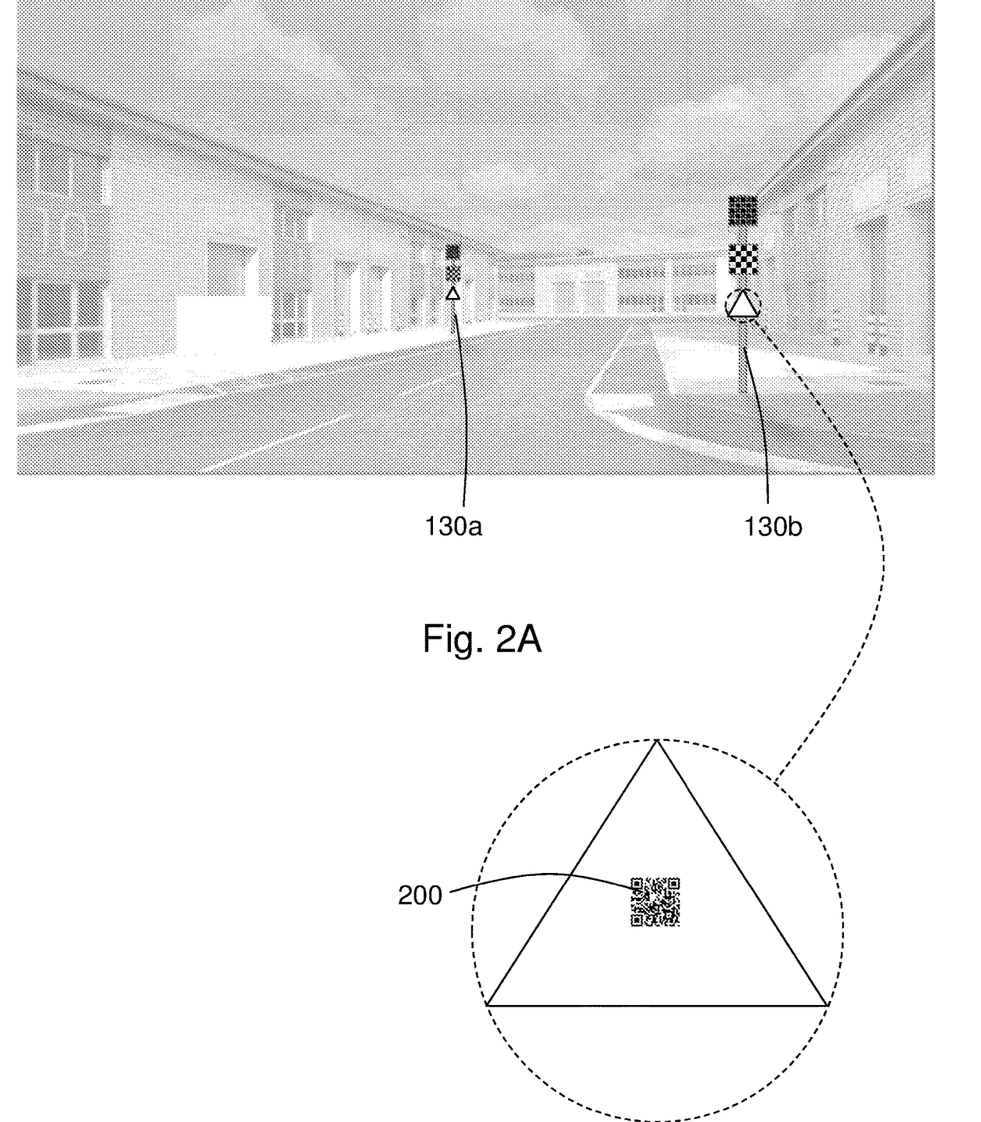
FIG. 2A illustrates a scenario comprising sensor targets in a road-side environment.

FIG. 2A illustrates a scenario of a driving environment with a road 110 and road-side sensor targets 130a, 130b.

Each of the sensor recognition zones 140a, 140b, 140c on the road-side sensor targets 130a, 130b may comprise localization dependent information 200. The localization dependent information 200 may be encoded in a visual code such as QR code, bar code, etc., on the sensor recognition zone 140a, 140b, 140c dedicated to visual sensor recognition.

By detecting the sensor recognition zone 140a, 140b, 140c and extract the localization dependent information 200 of the respective road-side sensor targets 130a, 130b, the vehicle 100 may obtain for example localization information but also local driving rules, map/directional information; working instructions for mining/agriculture/forestry, etc.; and/or sensor diagnostic patterns for continuous optical performance checks. It is hereby assured that the vehicle 100 is correctly localized, also in case of GPS navigation failure.

The sensor recognition zone 140a, 140b, 140c dedicated towards visual sensor recognition may comprise a display for outputting the localization dependent information 200. An advantage therewith is that the outputted information 200 may be updated instantly e.g. from a central traffic control tower and information concerning road work, traffic accidents, traffic congestions, recommendations for redirecting traffic, etc.

Some working places for vehicles 100 are very dynamic and navigation information may be obsolete very rapidly; for example, on construction sites, in mines, on deforestation sites and similar locations. It may thus be an advantage to be able to update the outputted information 200 to correspond with the current traffic situation/localization information.

FIGS. 2B-2E illustrates some distinct possible embodiments of the road-side sensor target 130.

In addition to the identification of the sensor target 130, it may also be possible to read its type/configuration. This could be done either using a sensor reading (i.e. a barcode as illustrated in FIG. 2A) or via wireless communication.

Figure 2B:
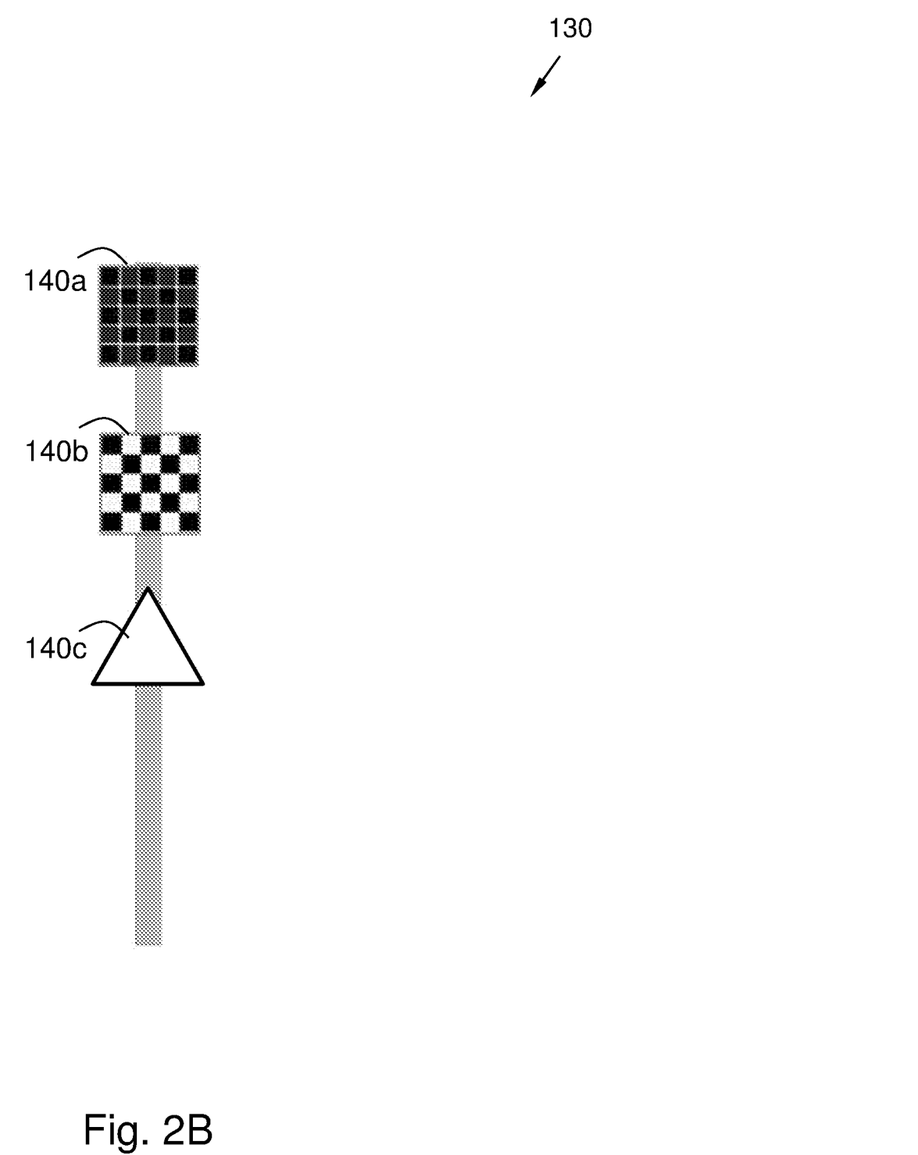
FIG. 2B illustrates a sensor target according to an embodiment.
Figure 2C:
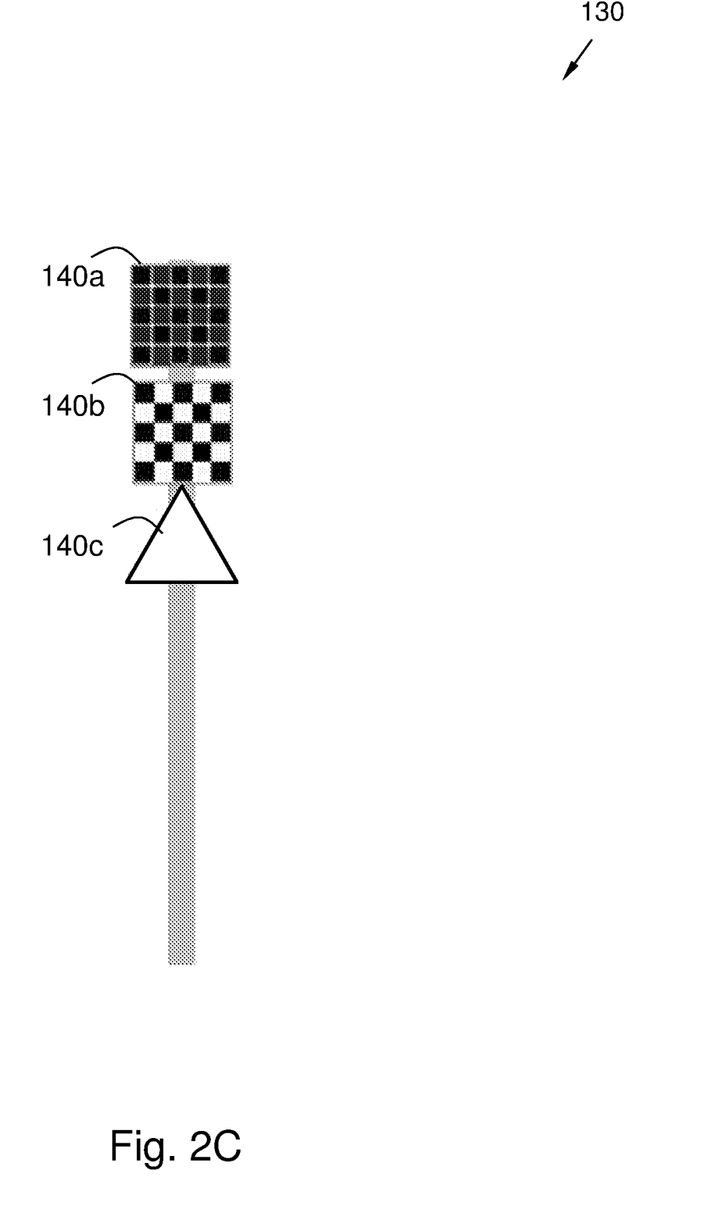
FIG. 2C illustrates a sensor target according to an embodiment.

In FIG. 2B and FIG. 2C, respectively, some alternative embodiments of the sensor target 130 are depicted. The distinct design, i.e. by elaborating the distances between different sensor recognition zones 140a, 140b, 140c, makes it possible to identify the specific sensor target 130 at the specific location.

Figure 2D:
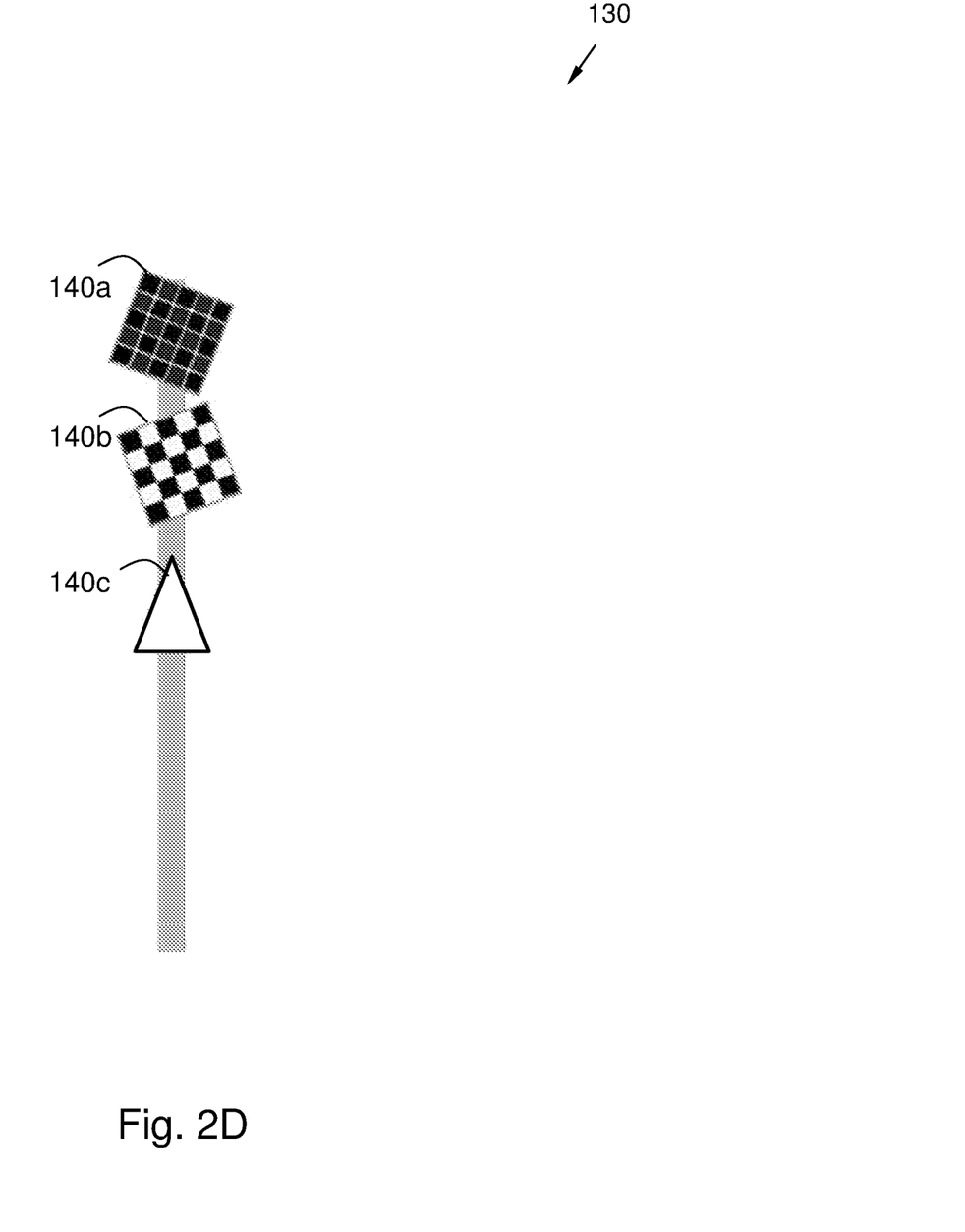
FIG. 2D illustrates a sensor target according to an embodiment.

FIG. 2D presents an embodiment of the sensor target 130 wherein at least some of the sensor recognition zones 140a, 140b, 140c has been rotated in any axis.

By rotating the sensor recognition zones 140a, 140b, 140c in some embodiments, and by utilizing different types of sensor targets 130 in different variants, enables a better and more complete calibration of the system. To perform the calibration the vehicle 100 may need to know certain parameters for the specific target 130.

Figure 2E:
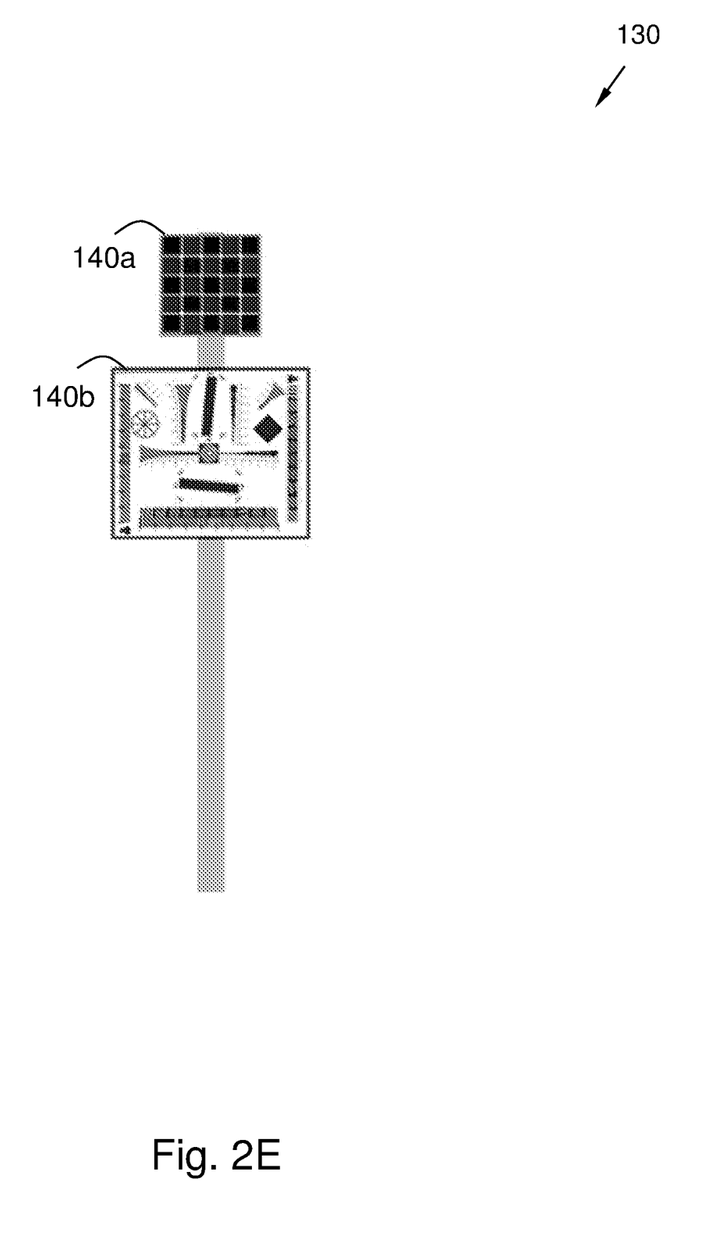
FIG. 2E illustrates a sensor target according to an embodiment.

FIG. 2E illustrates another embodiment of the sensor target 130 comprising one sensor recognition zone 140a dedicated to lidar and one sensor recognition zone 140b dedicated to advanced image sensor configuration.

By using different types of sensor targets 130, sensor calibration may be further improved.

Figure 3:
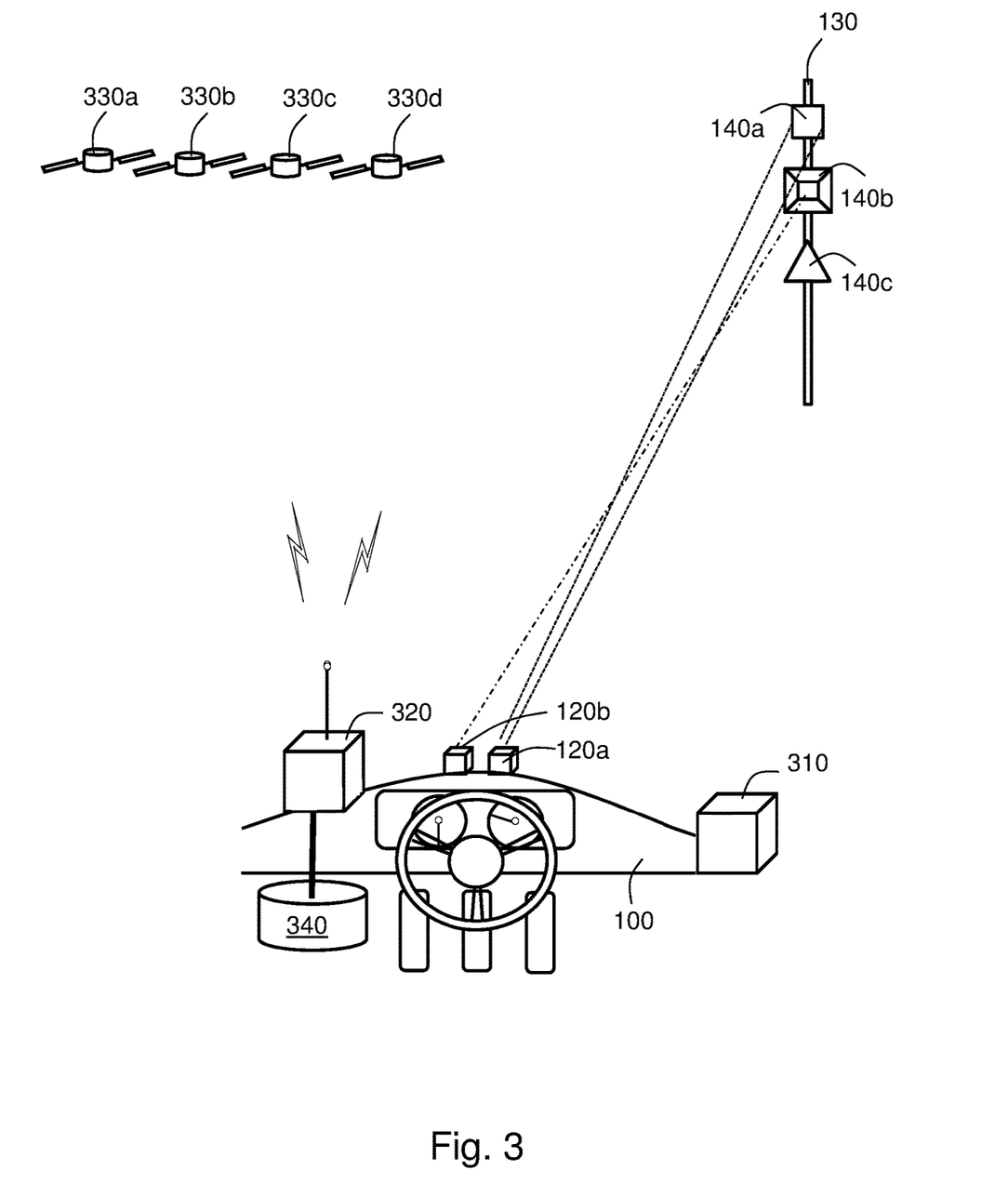
FIG. 3 illustrates a vehicle interior according to an embodiment of the invention.

FIG. 3 illustrates an example of a scenario as it may be perceived by a hypothetical driver of the vehicle 100 from within the vehicle 100.

The vehicle 100 comprises a control arrangement 310 for obtaining information from a sensor target 130 and calibrating an onboard sensor 120a, 120b, 120c. The control arrangement 310 is configured to detect a plurality of recognition zones 140a, 140b, 140c on sensor targets 130, wherein each recognition zone 140a, 140b, 140c comprises a recognition pattern 200 dedicated to a distinct sensor modality with a respective onboard sensor 120a, 120b, 120c. Further, the control arrangement 310 is configured to calibrate the onboard sensor 120a, 120b, 120c based on sensor detection of the respective recognition zone 140a, 140b, 140c. In addition, the control arrangement 310 is also configured to obtain localization dependent information 200 associated with at least one detected recognition zone 140a, 140b, 140c, via vehicle sensor reading such as geographical coordinates and/or map data.

The control arrangement 310 may comprise e.g. one or several Electronic Control Units (ECUs), typically a plurality of interacting ECUs. The control arrangement 310 may comprise a digital computer that controls one or more electrical systems, or electrical sub systems, of the vehicle 100, based on e.g. information read from the sensors 120a, 120b, 120c placed at various parts and in different components of the vehicle 100. ECU is a generic term that often is used in automotive electronics, for any embedded system that controls one or more of the electrical system or sub systems in the vehicle 100. The control arrangement 310 may be particularly designated to implement height estimation and distance measurements based on sensor input and to perform parameter comparisons and make decisions based on the outcome of the made comparison.

The geographical position of the vehicle 100 may be determined by a positioning unit 320 in the vehicle 100, such as a navigator, which may be based on a satellite navigation system such as the Navigation Signal Timing and Ranging (Naystar) Global Positioning System (GPS), Differential GPS (DGPS), Galileo, GLONASS, or the like.

The control arrangement 310 may be configured to determine vehicle position at least partly based on the obtained localization dependent information 200 associated with at least one detected recognition zone 140a, 140b, 140c, via vehicle sensor reading, in some embodiments.

However, the geographical position of the vehicle 100 may be determined by the control arrangement 310 based on information obtained from the positioning unit 320. The geographical position of the vehicle 100 may be determined continuously with a certain predetermined or configurable time intervals according to various embodiments.

Positioning by satellite navigation is based on distance measurement using triangulation from a number of satellites 330a, 330b, 330c, 330d. In this example, four satellites 330a, 330b, 330c, 330d are depicted, but this is merely an example. More than four satellites 330a, 330b, 330c, 330d may be used for enhancing the precision, or for creating redundancy. The satellites 330a, 330b, 330c, 330d continuously transmit information about time and date (for example, in coded form), identity (which satellite 330a, 330b, 330c, 330d that broadcasts), status, and where the satellite 330a, 330b, 330c, 330d are situated at any given time. The GPS satellites 330a, 330b, 330c, 330d sends information encoded with different codes, for example, but not necessarily based on Code Division Multiple Access (CDMA). This allows information from an individual satellite 330a, 330b, 330c, 330d distinguished from the others' information, based on a unique code for each respective satellite 330a, 330b, 330c, 330d. This information can then be transmitted to be received by the appropriately adapted positioning device comprised in the vehicle 100.

Distance measurement can according to some embodiments comprise measuring the difference in the time it takes for each respective satellite signal transmitted by the respective satellites 330a, 330b, 330c, 330d to reach the positioning unit 320. As the radio signals travel at the speed of light, the distance to the respective satellite 330a, 330b, 330c, 330d may be computed by measuring the signal propagation time.

The positions of the satellites 330a, 330b, 330c, 330d are known, as they continuously are monitored by approximately 15-30 ground stations located mainly along and near the earth's equator. Thereby the geographical position, i.e. latitude and longitude, of the vehicle 100 may be calculated by determining the distance to at least three satellites 330a, 330b, 330c, 330d through triangulation. For determination of altitude, signals from four satellites 330a, 330b, 330c, 330d may be used according to some embodiments.

Having determined the geographical position of the positioning unit 320 (or in another way), it may be presented on a map, a screen or a display device where the position of the vehicle 100 may be marked, in some alternative embodiments.

The positioning unit 320 may be connected to a database 340, comprising map data and/or navigational information.

The control arrangement 310 may in some embodiments be further configured to adjust vehicle conveyance at least partly based on the obtained localization dependent information 200 associated with at least one detected recognition zone 140a, 140b, 140c, via vehicle sensor reading.

The control arrangement 310 may further be configured to verify the authenticity of the detected sensor target 130 based on a verification code comprised in the localization dependent information 200.

In yet some alternative embodiments, the control arrangement 310 may also be configured to receive localization dependent information, via a wireless receiver 160 of the vehicle 100, from a wireless communication device 150 of the sensor target 130.

Hereby, correct functionality of vehicle sensors 120a, 120b, 120c is ascertained, also for an autonomous vehicle 100 where possibly no human is inspecting the sensor functionality. Also, safer driving due to the transferred information is achieved.

Figure 4:
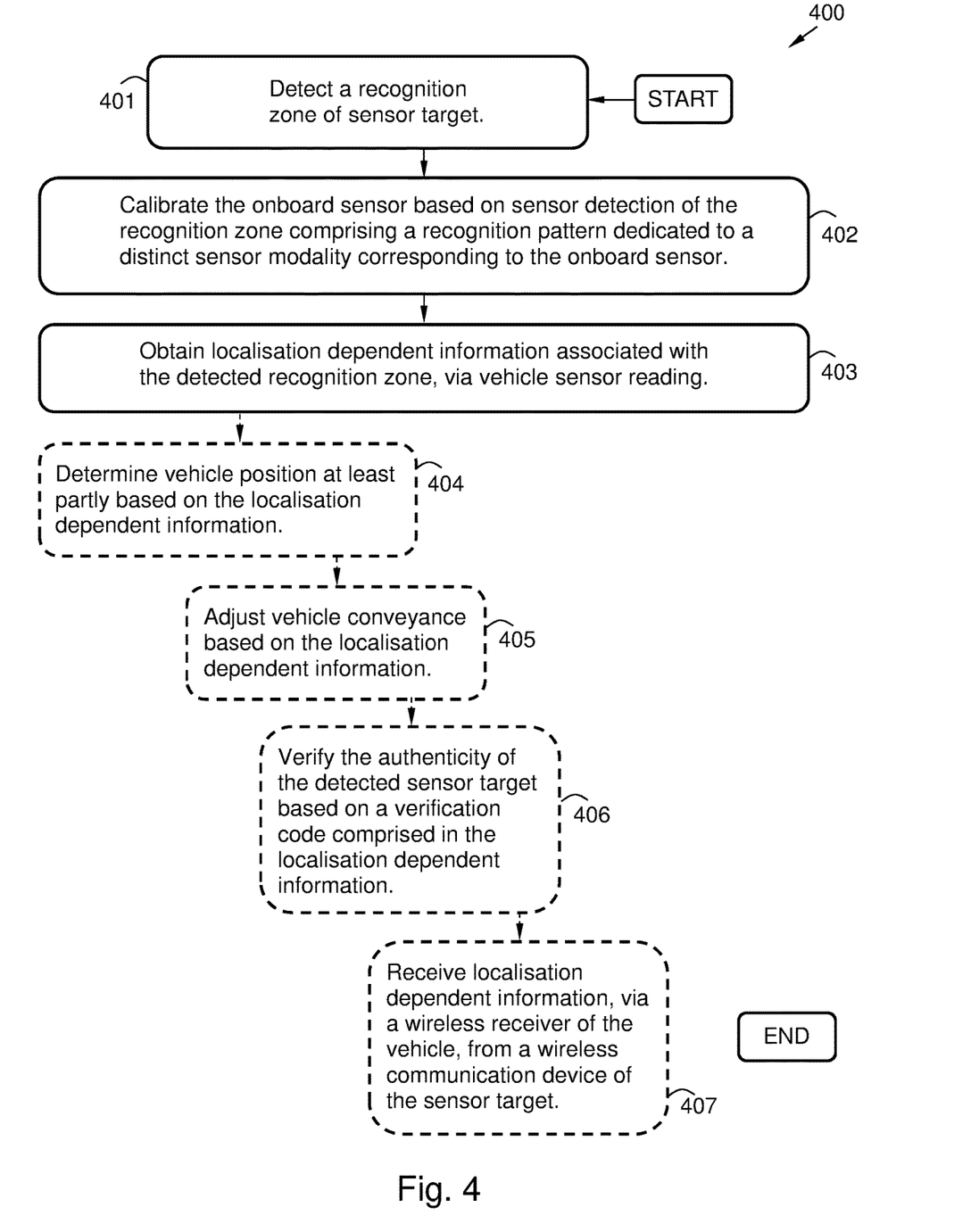
FIG. 4 is a flow chart illustrating an embodiment of a method.

FIG. 4 illustrates an example of a method 400 in a control arrangement 310 of a vehicle 100, for obtaining information from a sensor target 130 and calibrating an onboard sensor 120a, 120b, 120c.

The sensor 120a, 120b, 120c, or plurality of sensors (of the same or different types) as may be the case, may be comprised onboard the vehicle 100, i.e. on board the vehicle 100.

The sensor/-s 120a, 120b, 120c may comprise e.g. a camera, a stereo camera, an infrared camera, a video camera, a radar, a lidar, an ultrasound device, a time-of-flight camera, or similar device, in different embodiments (non-exhaustive list of non-limiting examples).

In order to be able to correctly obtain the information, the method 400 may comprise a number of steps 401-407. However, some of the described method steps 401-407 such as e.g. step 404-407 may be performed only in some embodiments. The described steps 401-407 may be performed in a somewhat different chronological order than the numbering suggests. The method 400 may comprise the subsequent steps:

Step 401 comprises detecting a plurality of recognition zones 140a, 140b, 140c on the sensor target 130, each comprising a recognition pattern dedicated to a distinct sensor modality with a respective onboard sensor 120a, 120b, 120c.

By providing the sensor target 130 with a plurality of recognition zones 140a, 140b, 140c, each dedicated to a distinct sensor modality, redundant localization dependent information 200 may be obtained and/or sensor calibration may be performed on the vehicle sensors 120a, 120b, 120c of the respective sensor modality. By providing redundant information 200, the information 200 with increased certainty may be provided to the control arrangement 310 of the vehicle 100, also in case one sensor 120a, 120b, 120c and/or one recognition zone 140a, 140b, 140c is defect.

The sensor modalities may be selected from: camera, lidar, radar, ultrasonic, infrared light, stereo vision, time-of-flight, video (non-exhaustive list of examples).

Step 402 comprises calibrating the onboard sensors 120a, 120b, 120c based on sensor detection 401 of the respective recognition zone 140a, 140b, 140c.

By continuously calibrating the onboard sensors 120a, 120b, 120c, e.g. on each time the vehicle 100 passes any sensor target 130, it is assured that the onboard sensors 120a, 120b, 120c are continuously calibrated.

Step 403 comprises obtaining localization dependent information 200 associated with at least one detected 401 recognition zone 140a, 140b, 140c, via vehicle sensor reading.

Some examples of localization dependent information 200 may be position of the sensor target 130, road width, height of the road passage (tunnel, passage under a bridge, entrance of a garage, or similar), information concerning local road work, accident, road structure such as bends, curves, crossings; marks on the road 110 indicating a pedestrian crossing, a speed bump, a hole or other irregularity in the road surface; a building or other structure in the vicinity of the road 110, etc.

Step 404, which may be performed only in some embodiments, comprises determining vehicle position at least partly based on the obtained 403 localization dependent information 200.

By obtaining vehicle positioning enabling information, it becomes possible to navigate the vehicle 100 with high precision, also in locations where satellite-based navigation is not available.

Step 405, which may be performed only in some embodiments, comprises adjusting vehicle conveyance based on the obtained 403 localization dependent information 200.

Hereby safe navigation of the vehicle 100 is ensured, also in an inconvenient driving environment.

Step 406, which may be performed only in some embodiments, comprises verifying the authenticity of the detected 401 sensor target 130 based on a verification code comprised in the localization dependent information 200.

By mistake, negligence, as a prank or an act of terrorism, sensor targets 130 and/or information 200 provided on the respective sensor targets 130 may be modified. Serious accidents involving vehicles 100 may result as the vehicles 100 may be dependent on the localization dependent information 200 for its safe navigation.

The localization dependent information 200 may comprise a code, for example a check code, for ensuring that the sensor target 130 is situated in its original position; and/or that the provided information 200 has not been modified.

The verification code may for example comprise Cyclic Redundancy Check (CRC) code, a hash code, be based on a shared secret, or similar.

Step 407, which may be performed only in some embodiments, comprises receiving localization dependent information 200, via a wireless receiver 160 of the vehicle 100, from a wireless communication device 150 of the sensor target 130.

An advantage with providing localization dependent information 200 over the wireless communication interface is that the information could be obtained also when the sensor target 130 is blocked by an obstacle, when the sensor capacity is limited by weather conditions (darkness, mist, fog, smoke, dust, snow, etc.), when the onboard sensors 120a, 120b, 120c are defect or misdirected, and/or when the sensor target 130 comprising the recognition zones 140a, 140b, 140c has been tilted by a vehicle impact or other similar reason.

Another advantage with providing the information 200 via the wireless communication interface is that the information 200 may be updated from a central traffic surveillance point, for example when a traffic accident has occurred; or updating a localization map dependent on advances of a road work, for example.

The control arrangement 310 may also in some embodiments be configured to provide information 200 comprising data in object form, in some embodiments.

The control arrangement 310 may comprise a receiving circuit configured for collecting information from a sensor 120a, 120b, 120c.

The control arrangement 310 further comprises a processing circuitry configured for obtaining and interpreting information 200 from recognition zones 140a, 140b, 140c of the sensor target 130 by performing the described method 400 according to at least some of the steps 401-407.

Such processing circuitry may comprise one or more instances of a processing circuit, i.e. a Central Processing Unit (CPU), a processing unit, a processor, an Application Specific Integrated Circuit (ASIC), a microprocessor, or other processing logic that may interpret and execute instructions. The herein utilized expression "processing circuitry" may thus represent a processing circuitry comprising a plurality of processing circuits, such as, e.g., any, some or all of the ones enumerated above.

Furthermore, the control arrangement 310 may comprise a memory in some embodiments. The optional memory may comprise a physical device utilized to store data or programs, i.e., sequences of instructions, on a temporary or permanent basis. According to some embodiments, the memory may comprise integrated circuits comprising silicon-based transistors. The memory may comprise e.g. a memory card, a flash memory, a USB memory, a hard disc, or another similar volatile or non-volatile storage unit for storing data such as e.g. ROM (Read-Only Memory), PROM (Programmable Read-Only Memory), EPROM (Erasable PROM), EEPROM (Electrically Erasable PROM), etc. in different embodiments.

Further, the control arrangement 310 may comprise a signal transmitting circuit. The signal transmitting circuit may be configured for transmitting information to at least some information receiving unit.

The previously described method steps 401-407 to be performed in the control arrangement 310 may be implemented through the one or more processing circuits within the control arrangement 310, together with computer program product for performing at least some of the functions of the steps 401-407. Thus, a computer program product, comprising instructions for performing the steps 401-407 in the control arrangement 310 may perform the method 400 comprising at least some of the steps 401-407 for obtaining information from a sensor target 130 and calibrating an onboard sensor 120a, 120b, 120c, when the computer program is loaded into the one or more processing circuits of the control arrangement 310. The described steps 401-407 thus may be performed by a computer algorithm, a machine executable code, a non-transitory computer-readable medium, or software instructions programmed into a suitable programmable logic such as the processing circuits in the control arrangement 310.

The computer program product mentioned above may be provided for instance in the form of a data carrier carrying computer program code for performing at least some of the step 401-407 according to some embodiments when being loaded into the one or more processing circuitry of the control arrangement 310. The data carrier may be, e.g., a hard disk, a CD ROM disc, a memory stick, an optical storage device, a magnetic storage device or any other appropriate medium such as a disk or tape that may hold machine readable data in a non-transitory manner. The computer program product may furthermore be provided as computer program code on a server and downloaded to the control arrangement 310 remotely, e.g., over an Internet or an intranet connection.

As used herein, the term "and/or" comprises any and all combinations of one or more of the associated listed items. The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware but may also be distributed in other forms such as via Internet or other wired or wireless communication system.

The invention claimed is:

1. A sensor target for enabling calibration of vehicle sensors, wherein the sensor target comprises:
   a plurality of recognition zones, each comprising a recognition pattern dedicated to a distinct sensor modality, for enabling calibration of vehicle sensors of the respective sensor modality; and
   localization dependent information associated with at least one recognition zone, provided to a vehicle via a vehicle sensor reading, wherein the localization dependent information comprises localization information in the form of geographical coordinates,
   wherein the localization dependent information further comprises a verification code configured to authenticate the sensor target.

2. The sensor target according to claim 1, further comprising a wireless communication device for providing localization dependent information to a wireless receiver of the vehicle.

3. The sensor target according to claim 1, wherein the verification code comprises at least one of: a Cyclic Redundancy Check (CRC) code, a hash code, or a code based on a shared secret between the sensor target and the vehicle.

4. A method in a control arrangement of a vehicle, for obtaining information from a sensor target and calibrating an onboard sensor, which method comprises:
   detecting a plurality of recognition zones on the sensor target, each comprising a recognition pattern dedicated to a distinct sensor modality with a respective onboard sensor;
   calibrating the onboard sensors based on sensor detection of the respective recognition zone; and
   obtaining localization dependent information associated with at least one detected recognition zone, via vehicle sensor reading, wherein the localization dependent information comprises localization information in the form of geographical coordinates,
   wherein the localization dependent information further comprises a verification code configured to authenticate the sensor target.

5. The method according to claim 4, further comprising the step of:
   determining vehicle position at least partly based on the obtained localization dependent information.

6. The method according to claim 4, further comprising the step of:
   adjusting vehicle conveyance based on the obtained localization dependent information.

7. The method according to claim 4, further comprising the step of:
   receiving localization dependent information, via a wireless receiver of the vehicle, from a wireless communication device of the sensor target.

8. A control arrangement of a vehicle, for obtaining information from a sensor target and calibrating an onboard sensor, which control arrangement is configured to:

detect a plurality of recognition zones on the sensor target, each comprising a recognition pattern dedicated to a distinct sensor modality with a respective onboard sensor;

calibrate the onboard sensor based on sensor detection of the respective recognition zone; and obtain localization dependent information associated with at least one detected recognition zone, via vehicle sensor reading, wherein the localization dependent information comprises localization information in the form of geographical coordinates, wherein the localization dependent information further comprises a verification code configured to authenticate the sensor target.

9. The control arrangement according to claim 8, further configured to:

determine vehicle position at least partly based on the obtained localization dependent information.

10. The control arrangement according to claim 8, further configured to adjust vehicle conveyance based on the obtained localization dependent information.

11. The control arrangement according to claim 8, further configured to receive localization dependent information, via a wireless receiver of the vehicle, from a wireless communication device of the sensor target.

12. A non-transitory computer-readable medium comprising a computer program product, said computer program product for use in a control arrangement of a vehicle, for obtaining information from a sensor target and calibrating an onboard sensor, said computer program code comprising computer instructions to cause one or more control devices to perform the following operations:

detect a plurality of recognition zones on the sensor target, each comprising a recognition pattern dedicated to a distinct sensor modality with a respective onboard sensor;

calibrate the onboard sensors based on sensor detection of the respective recognition zone; and obtaining localization dependent information associated with at least one detected recognition zone, via vehicle sensor reading, wherein the localization dependent information comprises localization information in the form of geographical coordinates, wherein the localization dependent information further comprises a verification code configured to authenticate the sensor target.

13. A vehicle comprising sensors of different modalities and a control arrangement for obtaining information from a sensor target and calibrating an onboard sensor, which control arrangement is configured to:

detect a plurality of recognition zones on the sensor target, each comprising a recognition pattern dedicated to a distinct sensor modality with a respective onboard sensor;

calibrate the onboard sensor based on sensor detection of the respective recognition zone; and obtain localization dependent information associated with at least one detected recognition zone, via vehicle sensor reading, wherein the localization dependent information comprises localization information in the form of geographical coordinates, wherein the localization dependent information further comprises a verification code configured to authenticate the sensor target.

\* \* \* \* \*